March 10, 1942. D. F. WARNER 2,275,830
ELASTIC FLUID TURBINE
Filed June 17, 1939
Fig. 1.
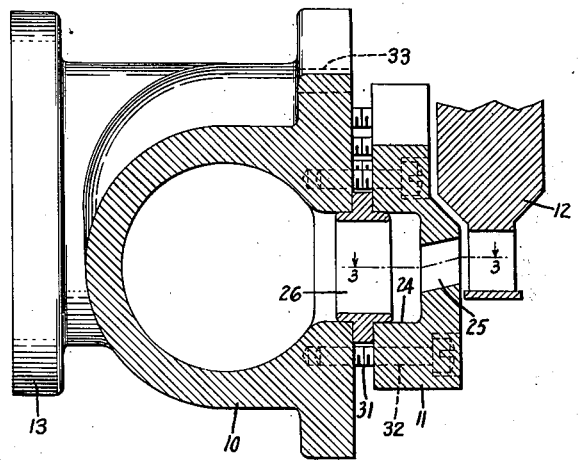
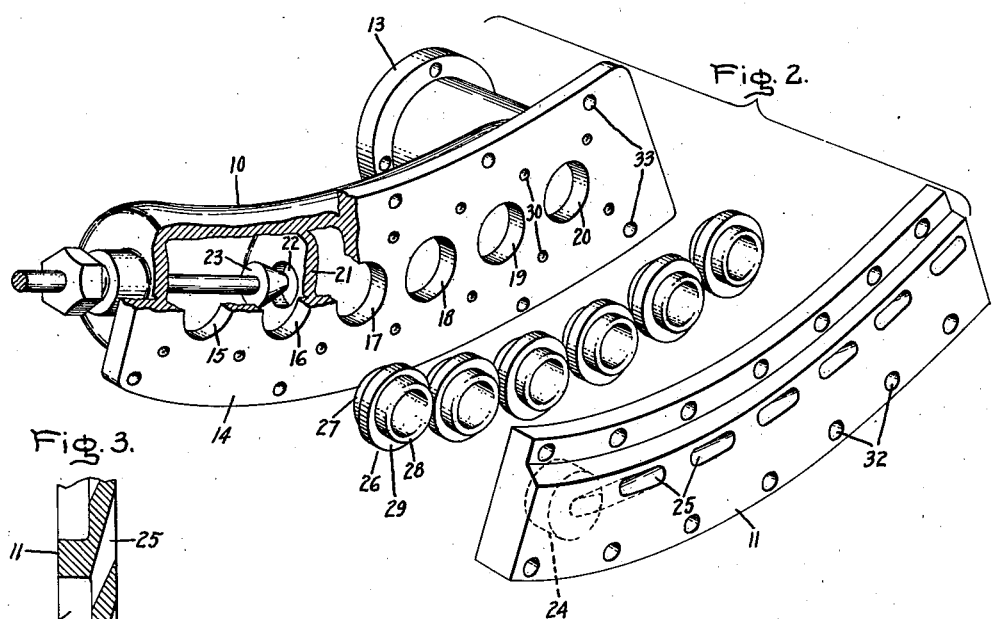
Fig. 2.
Fig. 3.
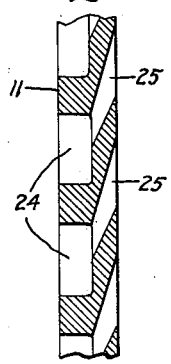
Inventor:
Donald F. Warner,
by Harry C. Dunham
His Attorney.

Patented Mar. 10, 1942

2,275,830

UNITED STATES PATENT OFFICE 2,275,830

ELASTIC FLUID TURBINE

Donald F. Warner, Swampscott, Mass., assignor to General Electric Company, a corporation of New York Application June 17, 1939, Serial No. 279,716

4 Claims. (Cl. 253—78)

The present invention relates to elastic fluid turbines, more particularly to valve chests and nozzle plates secured thereto for conducting elastic fluid to the first bucket wheel of a turbine. In many cases elastic fluid is admitted from separate chambers in the chest to groups of nozzles formed by the nozzle plate and it is important in such arrangements to avoid leakage of elastic fluid between the different groups of nozzles on the inlet side of the nozzle plate in order to assure efficient operation of the turbine. The prevention of leakage becomes more difficult and at the same time more important as the temperature and the pressure of the elastic fluid are increased.

The object of my invention is to provide an elastic fluid turbine, more particularly a valve chest and nozzle plate arrangement of the type aforementioned which may be operated safely with elastic fluid of high temperature and pressure without encountering difficulties due to leakage of elastic fluid between the inlets of separate nozzles or groups of nozzles.

For a consideration of what I believe to be novel and my invention, attention is directed to the following description and the claims appended thereto in connection with the accompanying drawing.

In the drawing, Fig. 1 illustrates a sectional view of a part of a turbine embodying my invention, Fig. 2 is an exploded, perspective view of a part of Fig. 1, and Fig. 3 is a section along lines 3—3 of Fig. 1.

The arrangement broadly comprises a valve chest 10 to which a nozzle plate 11 is secured for conducting elastic fluid to a first stage bucket wheel 12. More specifically, the chest 10 forms a flanged inlet conduit 13 for admitting elastic fluid to a chamber or chambers formed in the chest. The chest has a plane flanged wall 14 with a plurality of discharge openings 15, 16, 17, 18, 19 and 20. A partition 21 with an opening 22 forming a valve seat in cooperative relation with a hand-operated valve 23 divides the chest into two sections or chambers, a first section for directly admitting elastic fluid to the openings 17 to 20 inclusive and a second section admitting elastic fluid to the openings 15 and 16 only after the valve 23 has been opened. The nozzle plate 11 has a plurality of inlet openings or bores 24 extending part way through the plate and registering when assembled with the discharge openings 15 to 20 in the chest 10. Each opening or bore 24 communicates with a nozzle 25 formed in the nozzle plate. The width of the nozzles 25 in circumferential direction in the present instance is greater than the width of the nozzles 25 in radial direction. From another viewpoint, the nozzle plate 11 has a plurality of inlet openings 24 on one side thereof which openings are extended towards the other side of the plate to form nozzles having center lines at an angle to the center lines of the bores 24 (see Figs. 1 and 3). A separate gasket 26 is positioned between each of the openings 15 to 20 and the openings 24. Each gasket 26 has cylindrical or sleeve portions 27 and 28 projecting into the openings in the chest and the nozzle plate respectively and flanges 29 positioned between the adjacent surfaces of the chest 10 and the nozzle plate 11, the gaskets thus being in the form of flanged sleeves. For the purpose of obtaining a good seal, it is necessary primarily to maintain uniform thickness of the flanges 29 of the different gaskets. The gaskets may be made from steel or like material with high resistance against high temperature and high pressure.

The wall 14 of the chest has inner rows of bolt holes 30 for receiving bolts 31 projecting through similar holes 32 in the nozzle plate and rigidly securing the latter to the chest. The wall 14 of the chest 10 has outer bolt holes 33 for fastening the chest to the turbine casing, not shown.

During operation, elastic fluid admitted to the chest is conducted therefrom through the openings 17 to 20, inclusive, into the corresponding nozzles in the nozzle plate 11 and after opening of the valve 23, as pointed out above, elastic fluid is conducted through the openings 15, 16 to the corresponding openings and a group of nozzles to the nozzle plate.

Thus, with my invention I have provided an arrangement in which elastic fluid is conducted from a valve chest having a plurality of separate discharge openings or groups of openings through separate gaskets or sealing means to a plurality of separate inlet openings or groups of nozzles formed by a nozzle plate. By this arrangement the danger of leakage between the separate openings in the elastic fluid chest is substantially entirely eliminated, and in case such leakage should actually occur it becomes necessary to replace an individual gasket only. During operation considerable bending forces and stresses are set up in the nozzle plate as long as the valve 23 is closed. The flanged packing sleeves have considerable resistance and are not materially affected by the setting up of such bending forces and stresses in the nozzle plate and chest.

With the arrangement as shown and described above only comparatively few small bolts are needed securely to fasten the plate to the chest.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. Elastic fluid turbine including a chest having an inlet for receiving elastic fluid and a wall with a plurality of separate discharge openings, a nozzle plate supported on the wall and having a plurality of separate inlet openings, and separate sealing means between the discharge and inlet openings, each sealing means comprising a ring held between the wall and the plate and a sleeve secured to the ring and located in one of the openings.

2. Elastic fluid turbine including a chest having an inlet for receiving elastic fluid and a wall forming groups of discharge openings, a nozzle plate secured to the wall and having a plurality of inlet openings registering with the discharge openings and nozzle passages in substantial alignment with the inlet opening, individual gaskets between the discharge and inlet openings, each gasket having an inner diameter about equal to that of the corresponding openings, and means attached to each gasket to center it with one of the bores.

3. Elastic fluid turbine including a valve chest having a wall with a plurality of separate discharge openings, a nozzle plate having bores on one side registering with the discharge openings, each bore being extended to the other side of the plate to define nozzles, and a plurality of flanged sealing sleeves with flanges located between said wall and plate and sleeve portions extending into the discharge openings and the bores.

4. Elastic fluid turbine including a valve chest having a wall with a plurality of separate discharge openings forming groups, a partition and a valve in the chest to control the flow of fluid to one of the groups, a nozzle plate having a plurality of bores registering with said openings, individual sealing means for sealing the bores to the discharge openings, and bolts securing the nozzle plate to said wall.

DONALD F. WARNER.